United States Patent Office 3,418,810
Patented Dec. 31, 1968

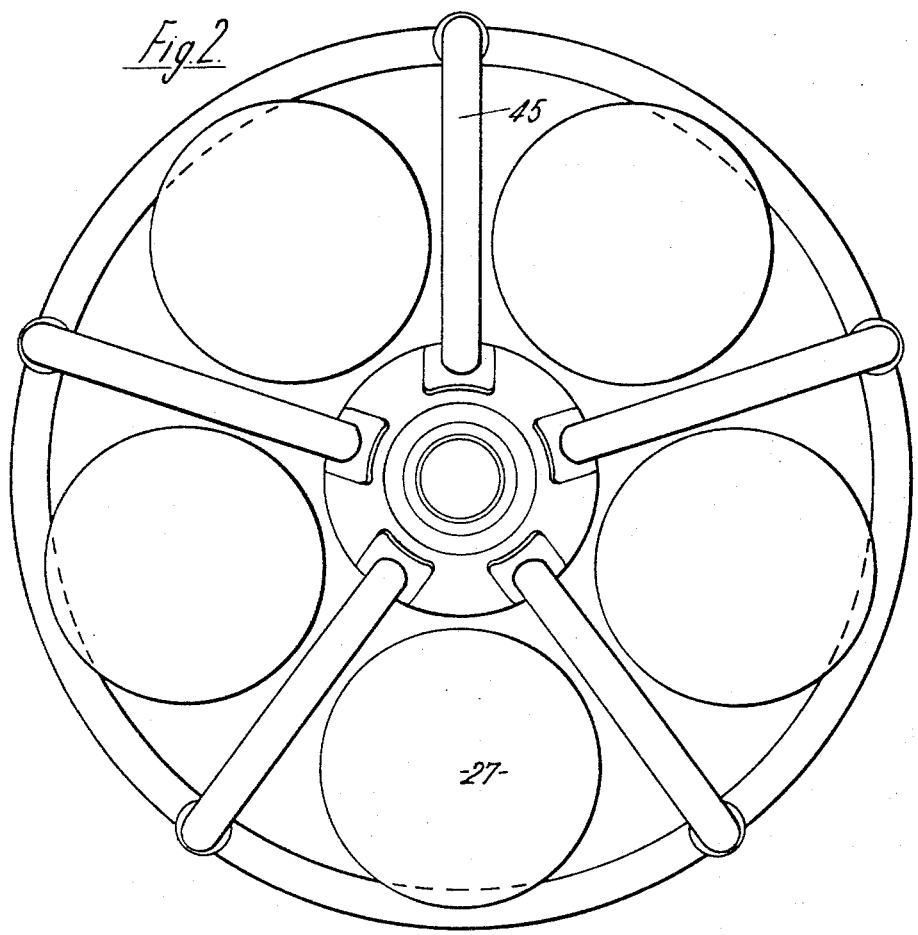
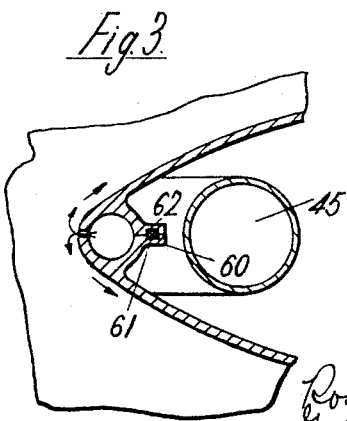

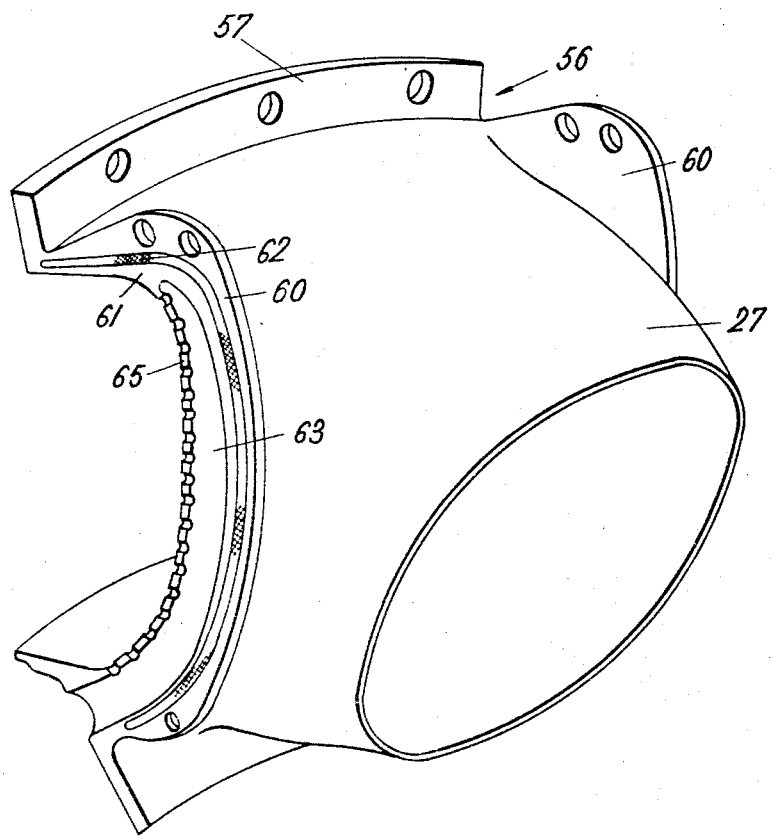

3,418,810
COOLING MEANS FOR ROTATABLE JET NOZZLE,
BEARING AND TURBINE BLADES
Roger Anthony Cresswell, Derby, and George Samuel
Kitson, Aspley, Nottingham, England, assignors to
Rolls-Royce Limited, Derby, England, a British company
Filed June 30, 1967, Ser. No. 650,509
Claims priority, application Great Britain, July 22, 1966,
33,108/66
12 Claims. (Cl. 60—232)

ABSTRACT OF THE DISCLOSURE

A gas turbine engine has a rotatable final nozzle structure through which pass the exhaust gases, rotation of the final nozzle structure in its bearing varying the direction in which the turbine exhaust gases are directed, and a stream of cooling fluid is employed to cool the bearing, the final nozzle structure, and the turbine blades.

---

Figure 1:
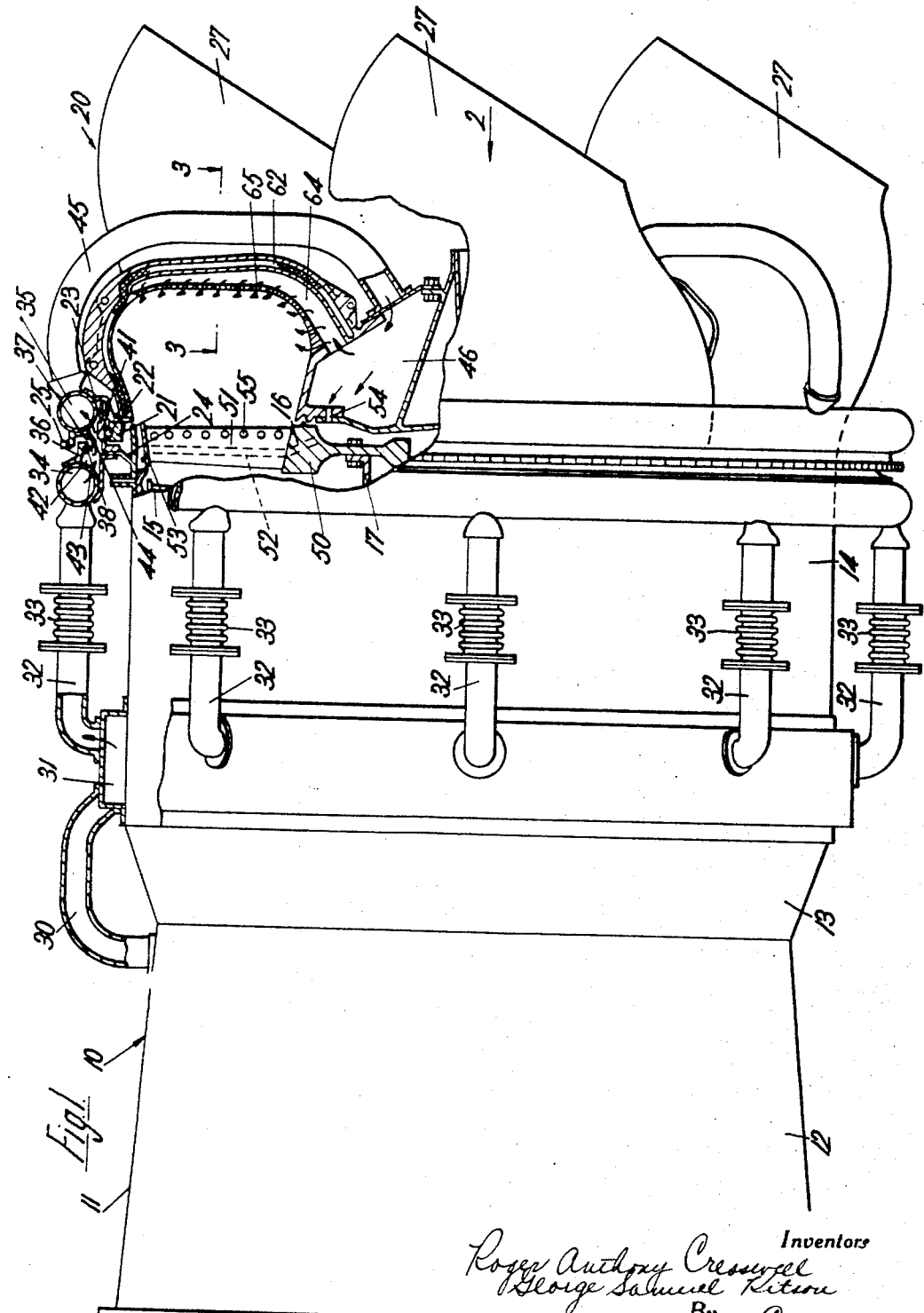

This invention concerns a gas turbine engine.

According to the present invention, there is provided a gas turbine engine having a final nozzle structure through which pass the exhaust gases from turbine means of the engine and which is rotatably mounted in a bearing carried by fixed structure, rotation of the final nozzle structure varying the direction in which the turbine exhaust gases are directed, and means for directing a stream of cooling fluid successively in heat exchange relationship with said bearing, said final nozzle structure, and turbine blades of said turbine means.

The final nozzle structure may comprise at least one exhaust nozzle which is longitudinally curved to deflect the turbine exhaust gases flowing therethrough. Thus the final nozzle structure may comprise an annular array of angularly spaced apart exhaust nozzles.

Duct means are preferably provided for passing the cooling fluid, which has been directed onto said bearing, to a collecting chamber which is arranged centrally of the final nozzle structure and which is disposed adjacent to the turbine blades. Each turbine blade may have a passage therethrough, the collecting chamber being provided with means for directing streams of cooling fluid into the respective passages.

The final nozzle structure may comprise a manifold which is rotatable therewith and which is disposed radially outwardly of and adjacent to the downstream end of the external surface of an outer race of said bearing, the cooling fluid being directed over the external surface of the outer race, and the said rotatable manifold being arranged to receive the cooling fluid which has passed over the said external surface.

Thus the said outer race may be carried by the engine casing which also carried a stationary manifold which is disposed radially outwardly of and adjacent to the upstream end of the external surface of said outer race, the stationary manifold being arranged to receive air from the engine compressor and to direct said air over the external surface of the outer race.

Sealing means may be provided to form a sealed passage which extends between the stationary and rotatable manifolds and one surface of which is constituted by the external surface of the outer race, the manifolds being provided with apertures communicating with said sealed passage.

Means may be provided for directing part of the cooling fluid from said collecting chamber to pass betwen and cool the angularly spaced apart exhaust nozzles.

The said array of angularly spaced apart exhaust nozzles may comprise a plurality of segments which are sealed to each other and each of which is provided with an exhaust nozzle.

The invention as illustrated, merely by way of example, in the accompanying drawings, in which:

FIGURE 1 is a diagrammatic view partly in section of a gas turbine engine according to the present invention, FIGURE 2 is a diagrammatic end view of the engine looking in the direction of the arrow 2 of FIGURE 1, FIGURE 3 is a broken-away sectional view taken on the line 3—3 of FIGURE 1, and FIGURE 4 is a perspective view of part of the final nozzle structure of the engine of FIGURE 1.

Referring to the drawings, a gas turbine engine 10, for use in a vertical or short take-off aircraft, has an engine casing 11 in which there are arranged in flow series, a low pressure compressor 12, a high pressure compressor 13, combustion equipment 14, a high pressure turbine 15 and a low pressure turbine 16. The low pressure turbine 16 drives the low pressure compressor 12 by way of a shaft 17, the shaft 17 being mounted concentrically within another shaft (not shown) on which the high pressure turbine 15 and the high pressure compressor 13 are mounted.

Mounted at the downstream end of the engine 10 is a final nozzle structure 20. The final nozzle structure 20 carries at its upstream end an inner race 21 of a bearing 22. The bearing 22 has an outer race 23 carried by a flanged member 24 which is mounted at the downstream end of the engine casing 11 and which thus constiututes fixed structure. The final nozzle structure 20 is thus rotatably mounted in the bearing 22 and is provided with a ring gear 25 through which the final nozzle structure 20 may be rotated, by means not shown.

The final nozzle structure 20 comprises an annular array of five equi-spaced exhaust nozzles 27. Each of the exhaust nozzles 27 is longitudinally curved to deflect the turbine exhaust gases flowing therethrough, and it will thus be appreciated that, as the final nozzle structure 20 is rotated through the ring gear 25, the direction in which the turbine exhaust gases are expelled will be varied to enable the position of the aircraft to be controlled during take-off, Moreover if the engine 10 is mounted in a pod (not shown) which is suitably inclined to the horizontal, the final nozzle structure 20 may be rotated to a position in which vertical lift may be effected.

Part of the air compressed by the low pressure compressor 12 is supplied by way of a pipe 30 to an annular manifold 31 which extends about the engine casing 11 immediately upstream of the combustion equipment 14. The air from the manifold 31 is supplied, via a plurality of angularly spaced apart pipes 32 each of which includes an expansion bellows 33, to a stationary annular manifold 34. The stationary manifold 34, which is secured to the flange member 24 and is therefore carried by the engine casing 11, is disposed radially outwardly of, and adjacent to the upstream end of, the external surface of the outer race 23.

Mounted at the upstream end of the final nozzle structure 20 is an annular manifold 35 which is rotatable with the final nozzle structure 20. The manifold 35 is disposed radially outwardly of, and adjacent to the downstream end of, the external surface of the outer race 23.

The stationary manifold 34 and the rotatable manifold 35 are respectively provided with annular wall members 36, 37, which are sealed to each other by means of a piston ring seal 38. The inner race 21, which carries the final nozzle structure 20, is sealed to the outer race 23 by means of a piston ring seal 41. A sealed passage 42 is thus provided which extends between the stationary and rotatable manifolds 34, 35, respectively, one surface of the sealed passage 42 being constituted by the external surface of the outer race 23.

The manifolds 34, 35, are respectively provided with apertures 43, 44 which communicate with the sealed passage 42. Accordingly, a flow of cooling air from the low pressure compressor 12 is delivered from the stationary manifold 34 and over the external surface of the outer race 23 so as to pass to the rotable manifold 35.

Air in the rotatable manifold 35 may pass therefrom via a plurality of angularly spaced apart pipes 45 to an annular collecting chamber 46 which is arranged centrally of, and at the upstream end of, the final nozzle structure 20. The collecting chamber 46 is disposed immediately downsteram of root portions 50 of turbine blades 51 of the low pressure turbine 16.

Each of the turbine blades 51 has a passage 52 therethrough which extends from the respective root portion 50 to the tip 53 of the turbine blade 51. The collecting chamber 46 is provided with a plurality of angularly spaced apart apertures 54 through which streams of cooling air are directed from the collecting chamber 46 and into the root portions of the passages 52, this air finally emerging from the tips 53.

Each of the blades 51 is also provided adjacent its trailing edge with apertures 55 which communicate with the respective passages 52 so as to receive cooling air therefrom.

Thus the cooling air which has been used to cool the bearing 22 is thereafter employed to cool the turbine blades 51 of the low pressure turbine 16.

The final nozzle structure 20 comprises a plurality of segments 56 (see FIGURE 4) each of which is provided with a single exhaust nozzle 27. Each of the segments 56 has a flange 57 which is bolted to the inner race 21 of the bearing 22, and also has side flanges 60 by means of which it is bolted to the adjacent segments 56. Each of the side flanges 60 is provided along its length with a recess 61, asbestos or other packing material 62 being provided in the gap formed by the recesses 61 of the adjacent segments 56, whereby the segments 56 are sealed in a gas-tight manner to each other.

Each of the segments 56 is provided on each of its opposite sides with a recess 63 which, with the recess 63 of the adjacent segment 56, forms a channel 64 (FIGURE 1) which communicates with the collecting chamber 46 so as to receive part of the cooling air therefrom. Cooling air supplied to the channel 64 escapes from the latter through apertures 65 and thus flows over upstream surfaces of the exhaust nozzles 27 so as to cool said surfaces.

We claim:
1. A gas turbine engine having an engine casing, turbine means therein having turbine blades, a final nozzle structure through which pass the exhaust gases from the turbine means, a bearing carried by the engine casing, the final nozzle structure being rotatably mounted in the bearing, rotation of the final nozzle structure varying the direction in which the turbine exhaust gases are directed, and means for directing a stream of cooling fluid successively in heat exchange relationship with said bearing, said final nozzle structure, and said turbine blades.

2. A gas turbine engine as claimed in claim 1 in which the final nozzle structure comprises at least one exhaust nozzle which is longitudinally curved to deflect the turbine exhaust gases flowing therethrough.

3. A gas turbine engine as claimed in claim 2 in which the final nozzle structure comprises an annular array of angularly spaced apart exhaust nozzles.

4. A gas turbine engine as claimed in claim 1 in which duct means are provided for passing the cooling fluid, which has been directed onto said bearing, to a collecting chamber which is arranged centrally of the final nozzle structure and which is disposed adjacent to the turbine blades.

5. A gas turbine engine as claimed in claim 4 in which each turbine blade has a passage therethrough, the collecting chamber being provided with means for directing streams of cooling fluid into the respective passages.

6. A gas turbine engine as claimed in claim 5 in which each passage extends from the root to the tip of the respective turbine blade, the cooling fluid being directed to the root portion of the passage.

7. A gas turbine engine as claimed in claim 6 in which each turbine blade has apertures adjacent its trailing edge which communicate with the respective said passage to receive cooling fluid therefrom.

8. A gas turbine engine as claimed in claim 1 in which the final nozzle structure comprises a manifold which is rotatable therewith and which is disposed radially outwardly of and adjacent to the downstream end of the external surface of an outer race of said bearing, the cooling fluid being directed over the external surface of the outer race, and the said rotatable manifold being arranged to receive the cooling fluid which has passed over the said external surface.

9. A gas turbine engine as claimed in claim 8 in which the said outer race is carried by the engine casing which also carries a stationary manifold which is disposed radially outwardly of and adjacent to the upstream end of the external surface of said outer race, the stationary manifold being arranged to receive air from the engine compressor and to direct said air over the external surface of the outer race.

10. A gas turbine engine as claimed in claim 9 in which sealing means are provided to form a sealed passage which extends between the stationary and rotatable manifolds and one surface of which is constituted by the external surface of the outer race, the manifolds being provided with apertures communicating with said sealed passage.

11. A gas turbine engine as claimed in claim 4 in which means are provided for directing part of the cooling fluid from said collecting chamber to pass between and cool the angularly spaced apart exhaust nozzles.

12. A gas turbine engine as claimed in claim 11 in which the said array of angularly spaced apart exhaust nozzles comprise a plurality of segments which are sealed to each other and each of which is provided with an exhaust nozzle.

References Cited
UNITED STATES PATENTS 3,263,420　8/1966　Spears _____ 60—232
3,327,480　6/1967　Gunter _____ 60—232

FOREIGN PATENTS 1,246,339　10/1960　France.

CARLTON R. CROYLE, *Primary Examiner.*

U.S. Cl. X.R.

60—262, 263, 266; 239—265.35